United States Patent
Croyle et al.

(10) Patent No.: US 8,146,933 B2
(45) Date of Patent: Apr. 3, 2012

(54) VEHICLE DAMPER ATTACHMENT STRUCTURE SYSTEM AND METHOD

(75) Inventors: Thomas H. Croyle, Milford Center, OH (US); Robert Zummallen, East Liberty, OH (US); Anthony Ordonio, Dublin, OH (US); Edouard Stuart Sandoz, Powell, OH (US); Michael Pugnale, Columbus, OH (US); Steven Hansen, Dublin, OH (US); Matthew Wolfe, Powell, OH (US); Matthew Lux, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 536 days.

(21) Appl. No.: 11/849,173

(22) Filed: Aug. 31, 2007

(65) Prior Publication Data

US 2009/0058032 A1 Mar. 5, 2009

(51) Int. Cl.
*B60G 15/00* (2006.01)
*B60G 13/00* (2006.01)

(52) U.S. Cl. .................. 280/124.155; 280/124.145

(58) Field of Classification Search ............... 280/124.1, 280/124.108, 124.109, 124.146, 124.154, 280/124.155, 781, 788; 296/29, 30, 203.01
See application file for complete search history.

(56) References Cited

U.S. PATENT DOCUMENTS

| | | | |
|---|---|---|---|
| 2,660,449 A * | 11/1953 | MacPherson | 280/124.149 |
| 5,087,074 A | 2/1992 | Komatsu et al. | |
| 5,102,164 A | 4/1992 | Fujinaka et al. | |
| 5,385,369 A * | 1/1995 | Mukai et al. | 280/788 |
| 5,580,121 A * | 12/1996 | Dange et al. | 296/181.4 |
| 6,068,275 A | 5/2000 | Chino | |
| 6,085,856 A | 7/2000 | Law et al. | |
| 6,113,144 A | 9/2000 | Lapic | |
| 6,234,568 B1 | 5/2001 | Aoki | |
| 6,354,616 B1 * | 3/2002 | Morin et al. | 280/124.147 |
| 6,464,239 B1 * | 10/2002 | Kim | 280/124.147 |
| 6,688,618 B2 | 2/2004 | Schmidt et al. | |
| 7,040,639 B2 * | 5/2006 | Tamura | 280/124.147 |
| 7,083,225 B2 * | 8/2006 | Yakata et al. | 296/203.04 |
| 7,281,756 B2 * | 10/2007 | Fukushi et al. | 296/203.04 |
| 7,513,329 B2 * | 4/2009 | Nakashima et al. | 180/312 |
| 7,559,402 B2 * | 7/2009 | Jennings et al. | 180/312 |
| 2004/0051292 A1 * | 3/2004 | Tamura | 280/781 |
| 2004/0140693 A1 * | 7/2004 | Gibbianelli et al. | 296/203.01 |
| 2004/0232647 A1 | 11/2004 | Kim | |
| 2006/0197300 A1 * | 9/2006 | Nakashima et al. | 280/124.109 |
| 2008/0296817 A1 * | 12/2008 | Shand et al. | 267/140.13 |
| 2009/0079232 A1 * | 3/2009 | Harada et al. | 296/203.01 |

* cited by examiner

*Primary Examiner* — Paul N Dickson
*Assistant Examiner* — Barry Gooden, Jr.
(74) *Attorney, Agent, or Firm* — Kenealy Vaidya LLP; Mark E. Duell

(57) ABSTRACT

An attachment structure system is disclosed for attaching a damper to a vehicle. The attachment structure system can include a stiffener body that has a central portion connected to a damper. The stiffener body can be connected to both the vehicle's frame and a vehicle body portion, such as the wheel housing, to reduce noise, vibration, and harshness from being transmitted to the driver of the vehicle, and to provide other structural and ride characteristic benefits to the vehicle.

20 Claims, 4 Drawing Sheets

VEHICLE DAMPER ATTACHMENT STRUCTURE SYSTEM AND METHOD

BACKGROUND

1. Field

The disclosed subject matter relates to an attachment structure system configured to attach a damper to a vehicle and also relates to a method of using the attachment structure system. In particular, the disclosed subject matter relates to an attachment structure system that includes a stiffener component or body and used for securing a vertical damper in a vehicle. The longitudinal axis of the damper can intersect a central portion of the stiffener body.

2. Brief Description of the Related Art

Conventional vehicle damper attachment structure systems for vertically oriented dampers include a metal stiffener structure that has a longitudinal axis extending in the vertical orientation with respect to the vehicle. The longitudinal axis of the stiffener structure is offset in a direction spaced along the longitudinal axis of the vehicle from a longitudinal axis of the vehicle damper (e.g., shock absorber, strut, spring, etc.). Thus, additional attachment components are needed to attach the vehicle damper to the vehicle frame and/or wheel house body structure. Moreover, the conventional damper attachment structure system includes a stiffener structure that is welded to the vehicle frame and/or vehicle body and which has additional structures that attach to and offset the vehicle damper from the stiffener. The stiffener and other attachment components extend parallel to and are spaced from the vehicle damper. The offset nature of the vehicle damper relative to the stiffener structure and attachment components results in a certain amount of flex in the attachment structure system, which is often disadvantageous in terms of controlling noise, vibration, and harshness characteristics for the vehicle. In addition, the stiffener and other attachment components are attached at points in single shear, which is also not ideal.

SUMMARY

The disclosed subject matter relates to a vehicle damper attachment and stiffener structure and method of use.

In accordance with an aspect of the disclosed subject matter, an attachment structure system is disclosed for attaching a damper to a vehicle. The vehicle has a front to back longitudinal axis direction, a side to side lateral axis direction, and an up/down vertical axis direction. The attachment structure system can include a vehicle frame having a longitudinal axis direction extending parallel with the front to back longitudinal axis direction of the vehicle, a vehicle body portion connected to the vehicle frame via a body-to-frame fastening structure, and a stiffener body connected to the vehicle frame at a first fastening location and a second fastening location. The first fastening location can be spaced from the second fastening location along the longitudinal axis direction of the vehicle frame. The stiffener body can be connected to the vehicle body portion at a third fastening location that is spaced from the first fastening location and the second fastening location. The damper can be connected to the stiffener body such that the damper is located between the first fastening location and the second fastening location when viewed from a position spaced in a side to side lateral axis direction from the stiffener body.

In accordance with another aspect of the disclosed subject matter, the damper can be configured as a shock absorber.

In accordance with yet another aspect of the disclosed subject matter, the stiffener can include a central portion located between the first fastening location and the second fastening location. The central portion extends in a direction parallel to the side to side lateral axis direction from the vehicle frame. The damper can be connected to the central portion of the stiffener body such that its' longitudinal axis intersects that stiffener body and can be spaced laterally from the vehicle frame.

In accordance with still another aspect of the disclosed subject matter, the third fastening location between the vehicle body portion and the stiffener body can be spaced from the first fastening location and second fastening location in a direction parallel to the up/down vertical axis direction.

In accordance with still another aspect of the disclosed subject matter, the stiffener body includes a side portion surface that is substantially planar and extends in a plane that is substantially normal to the longitudinal axis direction of the vehicle frame.

In accordance with still another aspect of the disclosed subject matter, the system can include a bracket that has a first bracket surface that is substantially parallel with the side portion surface of the stiffener body. A bracket-to-stiffener fastening structure can connect the first bracket surface to the side portion surface of the stiffener body.

In accordance with still another aspect of the disclosed subject matter, the bracket-to-stiffener fastening structure can be formed as a weld.

In accordance with still another aspect of the disclosed subject matter, the bracket-to-stiffener fastening structure extends into the stiffener body in a direction substantially parallel to the longitudinal axis direction of the vehicle frame.

In accordance with still another aspect of the disclosed subject matter, the bracket includes a second bracket surface that is substantially normal to the side portion surface of the stiffener body and substantially parallel with the longitudinal axis direction of the vehicle frame. The second bracket surface can be connected to the vehicle frame via a bracket-to-frame fastening structure.

In accordance with another aspect of the disclosed subject matter, an attachment structure system for attaching a damper to a vehicle can include a vehicle frame having a longitudinal axis direction extending parallel with the front to back longitudinal axis direction of the vehicle, a vehicle body portion connected to the vehicle frame via a body-to-frame fastening structure, a stiffener body connected to the vehicle frame at a first fastening location via a first fastening structure and a second fastening location via a second fastening structure, the first fastening location spaced from the second fastening location along the longitudinal axis direction of the vehicle frame. The stiffener body can be connected to the vehicle body portion at a third fastening location that is spaced from the first fastening location and the second fastening location, the first fastening structure having a longitudinal axis located in a plane that is substantially parallel with the longitudinal axis direction of the vehicle frame. A damper can be connected to the stiffener body at the central portion of the stiffener body.

In accordance with still another aspect of the disclosed subject matter, a method for attaching a damper to a vehicle can include providing a damper, a stiffener body, a vehicle body portion, and a vehicle frame that extends along a vehicle frame longitudinal axis and is connected to the vehicle body portion. The method can also include fastening the stiffener body to the vehicle frame via a first stiffener-to-frame fastening structure and a second stiffener-to-frame fastening structure such that the first stiffener-to-frame fastening structure is spaced from the second stiffener-to-frame fastening structure along the vehicle frame longitudinal axis direction. The method can also include fastening the stiffener body to the vehicle body portion via a stiffener-to-vehicle-body fastening structure, and connecting the damper to the stiffener body at a location between the first stiffener-to-frame fastening structure and the second stiffener-to-frame fastening structure as viewed from a direction perpendicular to the vehicle frame longitudinal axis direction.

In accordance with still another aspect of the disclosed subject matter, the method can include providing a bracket, welding the bracket to the vehicle frame, and welding the stiffener body to the bracket.

In accordance with yet another aspect of the disclosed subject matter, welding the bracket to the vehicle frame can include welding in a direction substantially perpendicular to the vehicle frame longitudinal axis. In addition, welding the stiffener body to the bracket can include welding in a direction substantially parallel to the vehicle frame longitudinal axis.

Still other features and characteristics of the disclosed subject matter will become apparent to those skilled in the art from a reading of the following detailed description of exemplary embodiments constructed in accordance therewith, and taken in conjunction with the accompanying drawings.

BRIEF DESCRIPTION OF THE DRAWINGS

The disclosed subject matter will become clear from the following description with reference to the accompanying drawings, wherein.

DETAILED DESCRIPTION OF EXEMPLARY EMBODIMENTS

The disclosed subject matter will now be described in more detail with reference to exemplary embodiments of the vehicle damper attachment structure system and method, given only by way of example, and with reference to the accompanying drawings.

The disclosed subject matter relates to a vehicle damper attachment structure system and method of use, and more particularly to a vehicle damper attachment structure system that utilizes a plurality of fastening locations for connecting a stiffener body to a vehicle frame and body along with a particular in-line disposition of the damper with respect to the stiffener body. The fastening locations can be in various substantially orthogonal positions. In addition, the longitudinal axis of the stiffener body and the vehicle damper can be substantially coincident and/or can fall within a plane that is vertically oriented and normal to the vehicle frame. In other words, the longitudinal axis of the damper can intersect the stiffener body and/or can be slightly offset in a lateral direction from the vehicle frame and body. In addition, the disclosed subject matter relates to a method for using an attachment structure system that includes the use of a plurality of orthogonal fastening structures between the stiffener body and the vehicle frame and/or body/wheelhouse. The method can also include attaching a damper to a stiffener body in a manner such that the longitudinal axis of the damper intersects the stiffener body and/or can be slightly offset in a lateral direction from the stiffener body, vehicle frame and body.

Figure 1:
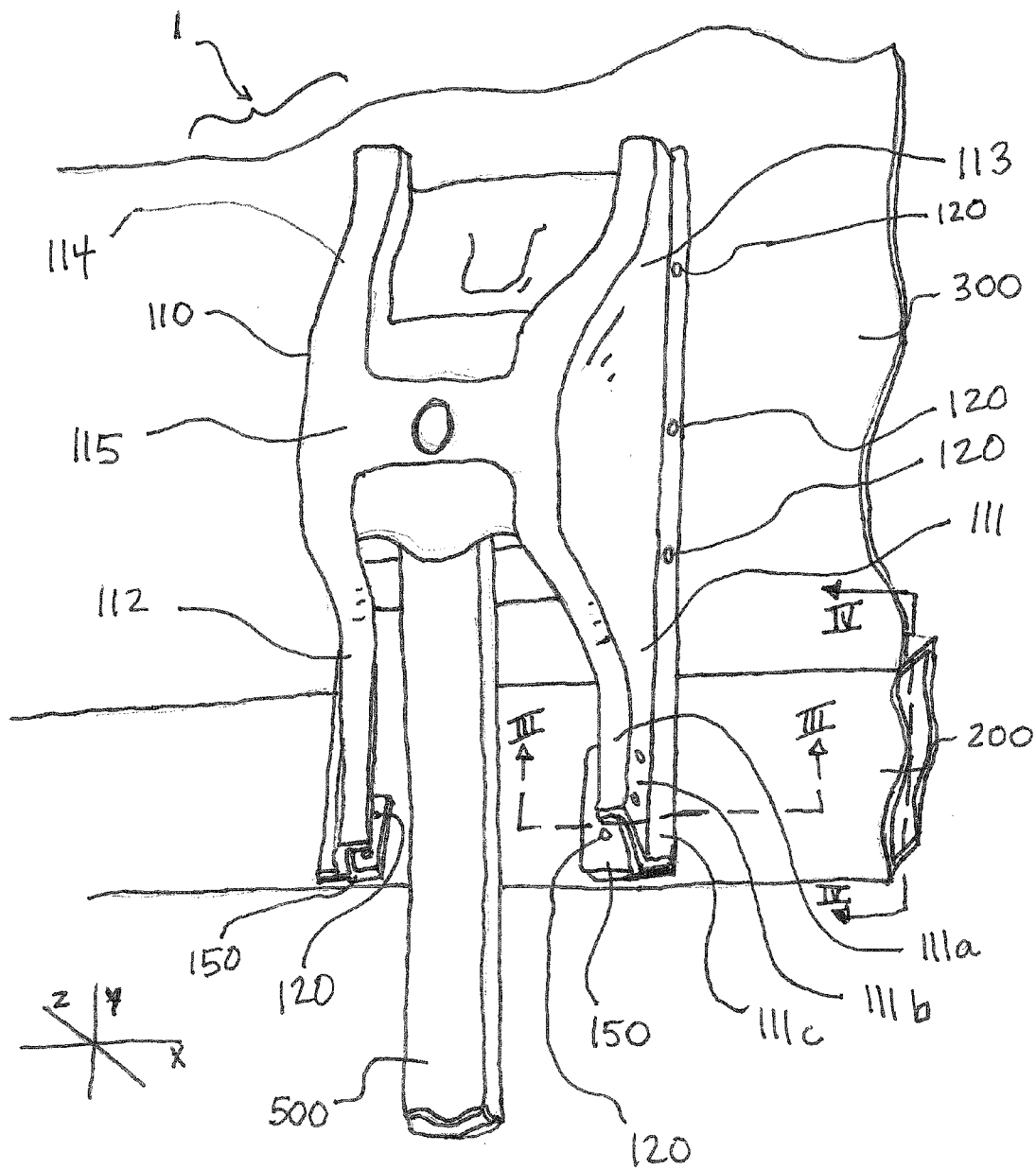
FIG. 1 is a partial perspective cross-sectional view of an embodiment of an attachment structure system made in accordance with principles of the disclosed subject matter.

FIG. 1 is a partial perspective cross-sectional view of an embodiment of an attachment structure system 1 made in accordance with principles of the disclosed subject matter. The attachment structure system 1 can include a stiffener body 110 that has a lower right extension 111, a lower left extension 112, an upper right extension 113, and an upper left extension 114. A central portion 115 can be located between the extensions 111-114 and configured for attachment to a top portion of a vehicle damper 500, such as a strut, shock absorber, spring, etc. Thus, the attachment structure system 1 provides both an attachment means and a stiffening means for providing a rigid and secure attachment of the damper 500 to the vehicle. The attachment structure system 1 can provide various characteristics to the associated vehicle, including a reduction in noise, vibration, and harshness, a reduction in flex of the attachment structure system, better prevention of vibration transmission from the wheels and associated suspension components to the frame and eventually interior of the vehicle, etc. The stiffener body 110 can be fastened to both a vehicle frame 200 and a vehicle body 300 by various fastening structures 120.

As shown in the figures, the x-axis corresponds with a direction parallel with the longitudinal axis of the vehicle frame 200 (and of the vehicle). The z-axis corresponds with a direction that is parallel with a typical lateral or side to side direction of the vehicle. For example, the z-axis corresponds with a direction substantially parallel with the rotational axes of the rear wheels of the vehicle. The y-axis corresponds to a direction parallel with a vertical up/down direction with respect to the vehicle (i.e., a direction normal to both the longitudinal and lateral axes of the vehicle).

The central portion 115 of the stiffener body 110 can be spaced from the extensions 111-114 of the stiffener body 110 in a lateral direction along the z-axis in the drawings such that a space is created within the stiffener body 110 in which the damper 500 can be attached. Thus, the central portion 115 of the stiffener body 110 substantially corresponds and can be substantially coincident with the longitudinal axis of the damper 500. Furthermore, the stiffener body 110 includes left extensions 112 and 114 that are located on a left side of the damper 500, and right extension 111 and 113 that are located on a right side of the damper 500, when the damper 500 is viewed from a direction laterally spaced from the vehicle (i.e., when viewed from along the z-axis).

The lower right extension 111 can include a top portion 111a that bends at a side portion 111b such that side portion 111b extends substantially perpendicular to a surface of the frame 200 when the stiffener body 110 is mounted to the frame 200. In addition, a flange 111c can extend from a bottom of the side portion 111b to provide a stabilizing surface (and possibly further attachment surface) for the lower right extension 111 that abuts and extends parallel with the frame 200 when the stiffener body 110 is mounted to the frame 200. Each of the other extensions 112-114 of the stiffener body 110 can include a similar structural configuration.

The stiffener body 110 can be attached to the vehicle frame 200 via a bracket 150. For example, in the presently described embodiment, the bracket 150 is configured as an L-shaped bracket. Fastening structure(s) 120 such as welds, or possibly rivets, screws, nuts and bolts, etc. can be used to secure the bracket 150 to the side portion 111b of the stiffener body 110. These same fastening structure(s) 120 can also attach the bracket 150 to the vehicle frame 200. A portion of the bracket 150 can be configured to extend perpendicularly from the vehicle frame 200 so that the fastening structure(s) 120 provide attachment points extending in the x-axis direction (in the longitudinal direction of the vehicle). Another portion of the bracket 150 can be configured to extend parallel with the vehicle frame 200 so that the fastening structure(s) 120 provide attachment points extending in the z-axis direction (in the lateral direction of the vehicle).

Fastening structure(s) 120 can also be provided to attach stiffener body 110 to the vehicle body 300, such as to the wheel housing of the vehicle body 300. The fastening structure(s) 120 that attach the stiffener body 110 to the vehicle body 300 are shown as being located in the bottom flange of the upper right extension 113 and in the bottom flange of the upper left extension 114. These particular fastening structure(s) 120 extend into the stiffener body 110 and vehicle body 300 in the z-axis direction (in the lateral direction of the vehicle).

Figure 2:
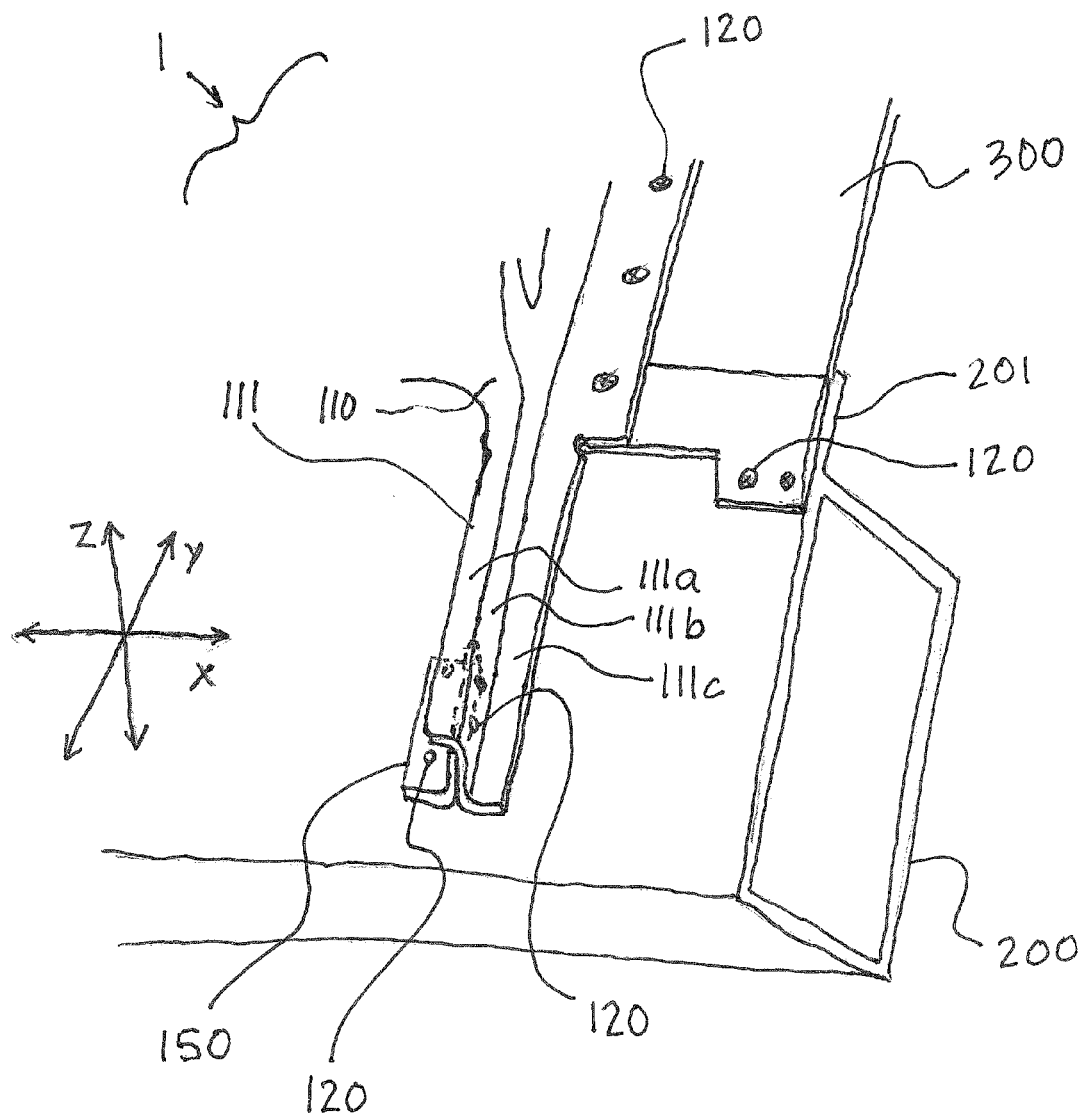
FIG. 2 is a partial perspective cross-sectional view of an embodiment of an attachment structure system made in accordance with principles of the disclosed subject matter.

FIG. 2 is a partial perspective cross-sectional view of another embodiment of an attachment structure system made in accordance with principles of the disclosed subject matter. In this embodiment, the bracket 150 is shown in hidden lines to better show the direction in which fastening structure(s) 120 attach the bracket 150 to both the vehicle frame 200 and to the stiffener body 110. Specifically, the fastening structure(s) 120 extend into the bracket 150 in two separate directions that can be substantially orthogonal to each other. A first fastening structure 120 extends in the x-axis direction (in the longitudinal direction of the vehicle) and a second fastening structure 120 extends in the z-axis direction (in the lateral direction of the vehicle). It should be understood that although the figures show specific points of attachment for fastening structure(s) 120, the actual configuration can take the form of a weld line or can include a plurality of separate fastening structures such as nuts and bolts, screws, rivets, etc.

In FIG. 2 the bracket 150 is shown as an L-bracket that is configured to have a surface extending substantially perpendicular to the vehicle frame 200 for attachment to a similarly oriented surface of the stiffener body 110. Fastening structure(s) 120 can extend in both the x-axis and z-axis directions to secure the stiffener body 110 to the vehicle frame 200 via the bracket 150 in two substantially orthogonally different directions.

The vehicle frame 200 can include an extension 201 for attachment to the vehicle body 300 via fastening structure(s) 120. The stiffener body 110 can be configured to mate with any changes in the surfaces joining the vehicle body 300 and vehicle frame 200.

Figure 3:
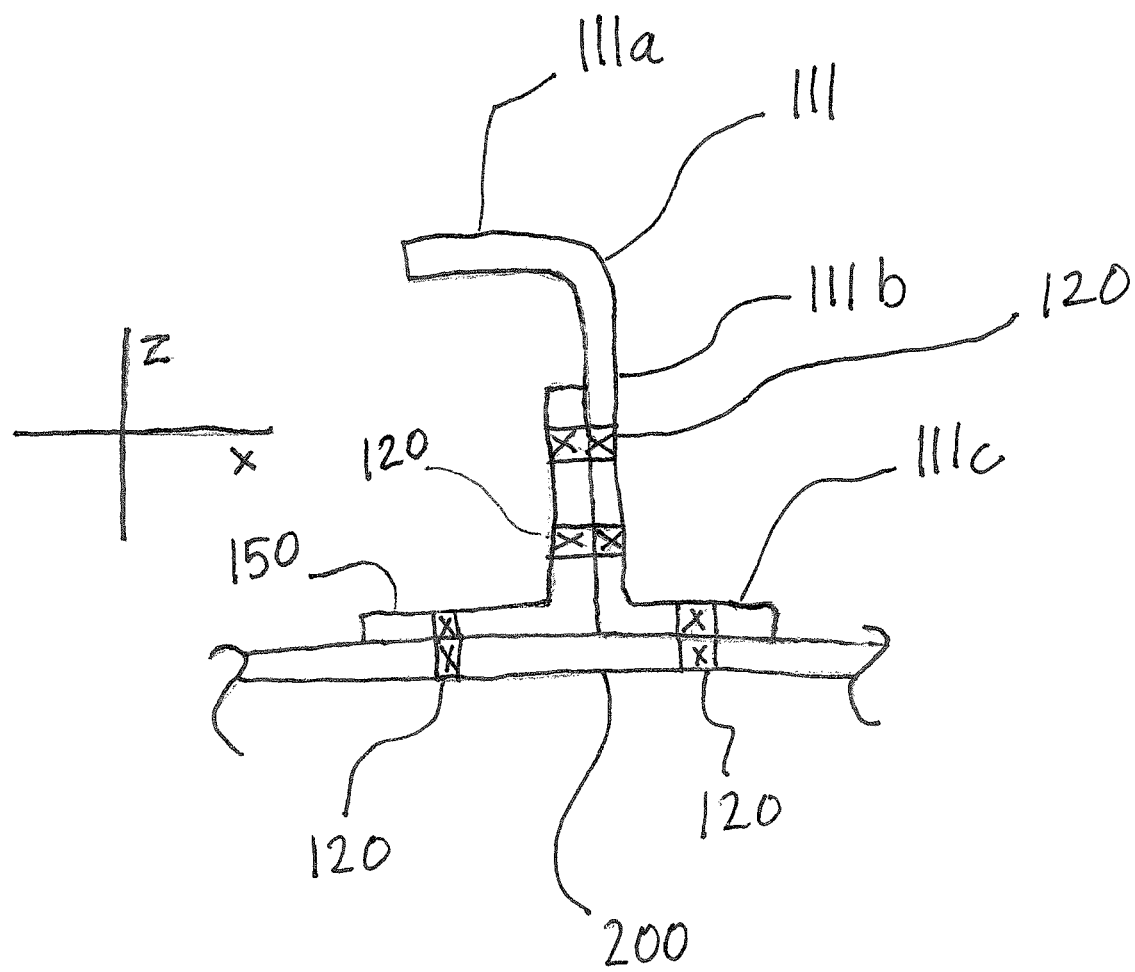
FIG. 3 is a partial cross-sectional view taken along line III-III of FIG. 1.

FIG. 3 is a partial cross-sectional view taken along line III-III of FIG. 1. This particular view shows fastening structure(s) 120 extending into both the x-axis and z-axis directions to secure the stiffener body 110 to the vehicle frame 200 via the bracket 150 in two substantially orthogonally different directions.

Figure 4:
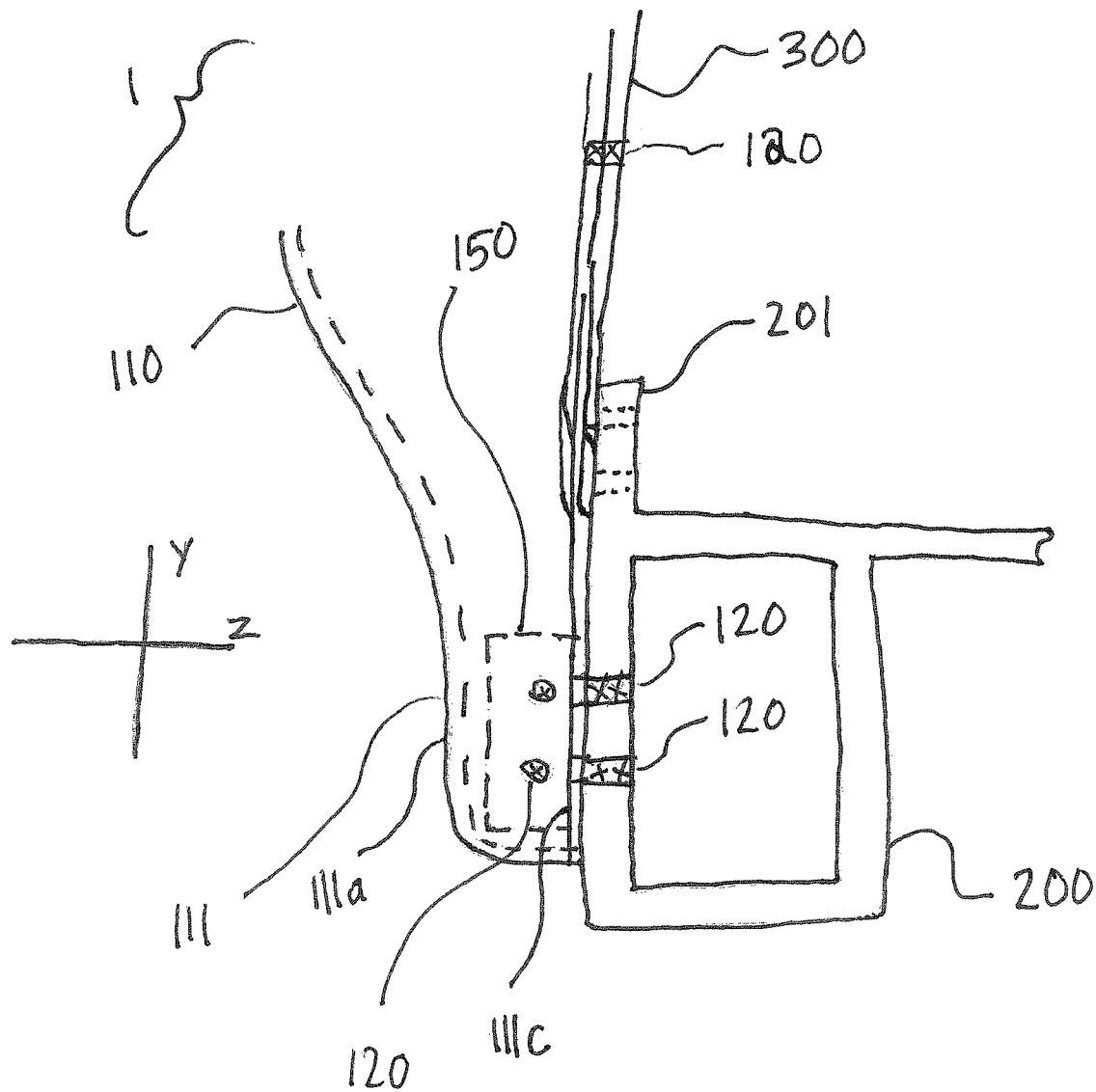
FIG. 4 is a partial cross-sectional view taken along line IV-IV of FIG. 1.

FIG. 4 is a partial cross-sectional view taken along line IV-IV of FIG. 1. This view also shows fastening structure(s) 120 extending in both the x-axis direction and into the z-axis direction to secure the stiffener body 110 to the vehicle frame 200 via the bracket 150 in two substantially orthogonally different directions. This view also shows a cross section of the vehicle frame 200 and vehicle body 300 to demonstrate one way in which these two structures can be attached to each other and to the stiffener body 110. Specifically, fastening structure(s) 120 can extend in the z-axis direction and through an upper portion of the lower right extension 111 to join the stiffener body 110, vehicle frame 200 and vehicle body 300 together. Fastening structure(s) 120 can also be provided in the lower flange of the upper right extension 113 to secure an upper portion of the stiffener body 110 to the vehicle body 300. The lower left extension 112 can be configured similar to the lower right extension 111 in terms of its connection to the vehicle frame 200 and vehicle body 300. Likewise, the upper left extension 114 can be configured similar to the upper right extension 113 in terms of its connection to the vehicle body 300.

The specific configuration described above can result in an attachment structure system 1 that includes a damper 500 spaced from the stiffener body 110 in a lateral z-axis direction but which is surrounded by portions of the stiffener body 110 when viewed along a direction spaced laterally from the vehicle. In other words, there can be substantially no offset in the x-axis direction between the damper 500 and a vertical axis of the stiffener body 110. This configuration removes certain shear forces that otherwise act in a single shear plane from acting upon certain components of the attachment structure system 1. For example, the attachment structure system 1 provides a lateral double shear damper connection in which the actual damper connection structure is contained within the stiffener body 110 (and not offset therefrom) providing the desired body rigidity to meet the noise, vibration, and harshness criteria for the vehicle. When a weld is used as the fastening structure 120, the weld on the stiffener body 110 that mates with the bracket 150 extends in a direction that is parallel to the longitudinal direction of the vehicle (x-axis) and, if using a line weld, can propagate in various direction, including the y-direction as shown between adjoining fastening structure(s) 120 (e.g., in a direction that is normal to a direction that is parallel to the longitudinal direction of the vehicle).

While there has been described what are at present considered to be exemplary embodiments of the invention, it will be understood that various modifications may be made thereto. For example, the specific shape of the stiffener body 110, bracket 150, vehicle frame 200 and vehicle body 300 can change significantly without departing from the spirit and scope of the invention. In particular, the shown embodiments are representative of a general concept, which is applicable to almost any vehicle in which a vertically oriented damper is used.

The specific shape of the various components of the attachment structure system 1 will also define the specific fastening orientation between the components. For example, the fastening orientation as shown between the stiffener body 110 and the vehicle frame 200 is within two orthogonal planes defined by the x-y plane and the y-z plane. However, this relationship is contemplated to differ, such that fastening orientation can be outside of the above-referenced planes, and may be three-dimensional and non-planar.

The material of the various components can be any of metal, ceramics, plastics, rubbers, etc. In the embodiment shown the material is selected from weldable metals.

The location of the fastening structure(s) 120 can also vary. For example, spot welds can be used at specific points or a line weld can be used to form a weld that propagates along a weld line that may join one or more of the location denoted by the fastening structure(s) 120 in the figures. There may also be fewer fastening structure(s) 120 that those shown in the exemplary figures. The number and type of fastening structure(s) 120 being dependent on particular application, design, and structural requirements. The type of fastening structure(s) 120 need not be uniform throughout the attachment structure system. Bolts, screws, welds etc., can all be used in combination or each can be used exclusively. In addition, although the location of fastening structure(s) 120 on the lower left extension 112 and lower right extension 111 is shown as being in alignment and parallel with the longitudinal axis of the vehicle frame 200, these relative positions can be changed without departing from the spirit and scope of the presently disclosed subject matter.

With regard to the longitudinal axis direction of the vehicle frame and other components of the disclosed subject matter, it should be understood that when something is described as being spaced along a longitudinal axis direction of the vehicle frame (for example) from something else, such a description is not equivalent to indicating that something is spaced along the longitudinal axis of the vehicle frame from something else. For example, when two components of the attachment structure system 1 are viewed from a z-axis direction of the system 1, and a longitudinal axis of a reference structure coincides with the x-axis, the two components can be considered to be spaced along the longitudinal axis direction of the reference structure if their x components are different, regardless of their y or z components.

The method for using the attachment structure system 1 can include providing a stiffener body 110 that has a central portion 115 and attaching the damper 500 to the central portion 115 of the stiffener body 110. The stiffener body 110 can be attached to the vehicle frame at two different locations along the longitudinal axis of the vehicle frame. The damper 500 can be positioned such that a longitudinal axis of the damper 500 is located between the two different locations when viewed from a laterally spaced position from the vehicle frame.

While there has been described what are at present considered to be exemplary embodiments of the invention, it will be understood that various modifications may be made thereto, and it is intended that the appended claims cover such modifications as fall within the true spirit and scope of the invention. Any conventional art document referenced above is/are hereby incorporated by reference in its entirety.

What is claimed is:

1. An attachment structure system for attaching a damper to a vehicle, the vehicle having a front to back longitudinal axis direction, a side to side lateral axis direction, and an up/down vertical axis direction, the attachment structure system comprising:
   a vehicle frame having a longitudinal axis direction extending parallel with the front to back longitudinal axis direction of the vehicle;
   a vehicle body portion connected to the vehicle frame via a body-to-frame fastening structure;
   a stiffener body connected to the vehicle frame at a first fastening location and a second fastening location, the first fastening location spaced from the second fastening location along the longitudinal axis direction of the vehicle frame, the stiffener body connected to the vehicle body portion at a third fastening location that is spaced from the first fastening location and the second fastening location, wherein the first fastening location is located in a plane that is substantially normal with the longitudinal axis direction of the vehicle frame and the second fastening location is located in a plane that is substantially parallel with the longitudinal axis direction of the vehicle frame; and
   a damper connected to the stiffener body such that the damper is located between the first fastening location and the second fastening location when viewed from a position spaced in a side to side lateral axis direction from the stiffener body when the stiffener body is attached to the vehicle.

2. The attachment structure system of claim 1, wherein the damper is a shock absorber.

3. The attachment structure system of claim 1, wherein the stiffener includes a central portion located between the first fastening location and the second fastening location, the central portion extends in a direction parallel to the side to side lateral axis direction from the vehicle frame, and the damper is connected to the central portion of the stiffener body.

4. The attachment structure system of claim 1, wherein the third fastening location between the vehicle body portion and the stiffener body is spaced from the first fastening location and second fastening location in a direction parallel to the up/down vertical axis direction.

5. The attachment structure system of claim 1, wherein the stiffener body includes a side portion surface that is substantially planar and extends in a plane that is substantially normal to the longitudinal axis direction of the vehicle frame, and the first fastening location is located on the side portion surface.

6. The attachment structure system of claim 5, further comprising:
   a bracket that includes a first bracket surface that is substantially parallel with the side portion surface; and
   a bracket-to-stiffener fastening structure connecting the first bracket surface to the side portion surface of the stiffener body.

7. The attachment structure system of claim 6, wherein the bracket-to-stiffener fastening structure is a weld.

8. The attachment structure system of claim 6, wherein the bracket-to-stiffener fastening structure extends into the stiffener body in a direction substantially parallel to the longitudinal axis direction of the vehicle frame.

9. The attachment structure system of claim 5, wherein the bracket includes a second bracket surface that is substantially normal to the side portion surface of the stiffener body and substantially parallel with the longitudinal axis direction of the vehicle frame, and the second bracket surface is connected to the vehicle frame via a bracket-to-frame fastening structure.

10. An attachment structure system for attaching a damper to a vehicle, the vehicle having a front to back longitudinal axis direction, a side to side lateral axis direction, and an up/down vertical axis direction, the attachment structure system comprising:
    a vehicle frame having a longitudinal axis direction extending parallel with the front to back longitudinal axis direction of the vehicle;
    a vehicle body portion connected to the vehicle frame via a body-to-frame fastening structure;
    a stiffener body connected to the vehicle frame at a first fastening location via a first fastening structure and at a second fastening location via a second fastening structure, the first fastening location spaced from the second fastening location along the longitudinal axis direction of the vehicle frame, the stiffener body connected to the vehicle body portion at a third fastening location that is spaced from the first fastening location and the second fastening location, the first fastening structure having a longitudinal axis located in a plane that is substantially parallel with the longitudinal axis direction of the vehicle frame, and the second fastening structure having a longitudinal axis located in a plane that is substantially normal with the longitudinal axis direction of the vehicle frame; and
    a damper connected to the stiffener body.

11. The attachment structure system of claim 10, wherein the damper is a shock absorber.

12. The attachment structure system of claim 10, wherein the stiffener body includes a central portion extending in a direction parallel to the side to side lateral axis direction from the vehicle frame, and the damper is connected to the central portion of the stiffener body.

13. The attachment structure system of claim 10, wherein the third fastening location between the vehicle body portion and the stiffener body is spaced from the first fastening location and second fastening location in a direction parallel to the up/down vertical axis direction.

14. The attachment structure system of claim 10, wherein the stiffener body includes a side portion surface that is substantially planar and extends in a plane that is substantially normal to the longitudinal axis direction of the vehicle frame.

15. The attachment structure system of claim 14, further comprising:
   a bracket that includes a first bracket surface that is substantially parallel with the side portion surface, wherein the first fastening structure connects the first bracket surface to the side portion surface of the stiffener body.

16. The attachment structure system of claim 15, wherein the first fastening structure is a weld.

17. The attachment structure system of claim 15, wherein the bracket includes a second bracket surface that is substantially normal to the side portion surface of the stiffener body and substantially parallel with the longitudinal axis direction of the vehicle frame, and the second bracket surface is connected to the vehicle frame via a bracket-to-frame fastening structure.

18. A method for attaching a damper to a vehicle, comprising:
   providing a damper, a stiffener body, a vehicle body portion, a bracket, and a vehicle frame, the vehicle frame extending along a vehicle frame longitudinal axis direction;
   fastening the stiffener body to the vehicle frame via a first stiffener-to-frame fastening structure and a second stiffener-to-frame fastening structure such that the first stiffener-to-frame fastening structure is spaced from the second stiffener-to-frame fastening structure along the vehicle frame longitudinal axis direction;
   fastening the stiffener body to the vehicle body portion via a stiffener-to-vehicle-body fastening structure;
   connecting the vehicle body portion to the vehicle frame; and
   connecting the damper to the stiffener body at a location between the first stiffener-to-frame fastening structure and the second stiffener-to-frame fastening structure as viewed from a direction perpendicular to the vehicle frame longitudinal axis direction; and
   fastening the stiffener body to the bracket via a stiffener-to-bracket fastening structure, wherein a longitudinal axis of the stiffener-to-bracket fastening structure is substantially perpendicular to a longitudinal axis of the stiffener-to-frame fastening structure.

19. The method of claim 18, further comprising:
   welding the bracket to the vehicle frame; and
   wherein fastening the stiffener body to the bracket via a stiffener-to-bracket fastening structure includes welding the stiffener body to the bracket.

20. The method of claim 19, wherein welding the bracket to the vehicle frame includes welding in a direction substantially perpendicular to the vehicle frame longitudinal axis direction, and welding the stiffener body to the bracket includes welding in a direction substantially parallel to the vehicle frame longitudinal axis direction.

* * * * *